No. 773,654. PATENTED NOV. 1, 1904.
J. T. LEMUS.
STEAM DINNER PAIL.
APPLICATION FILED FEB. 16, 1904.
NO MODEL.
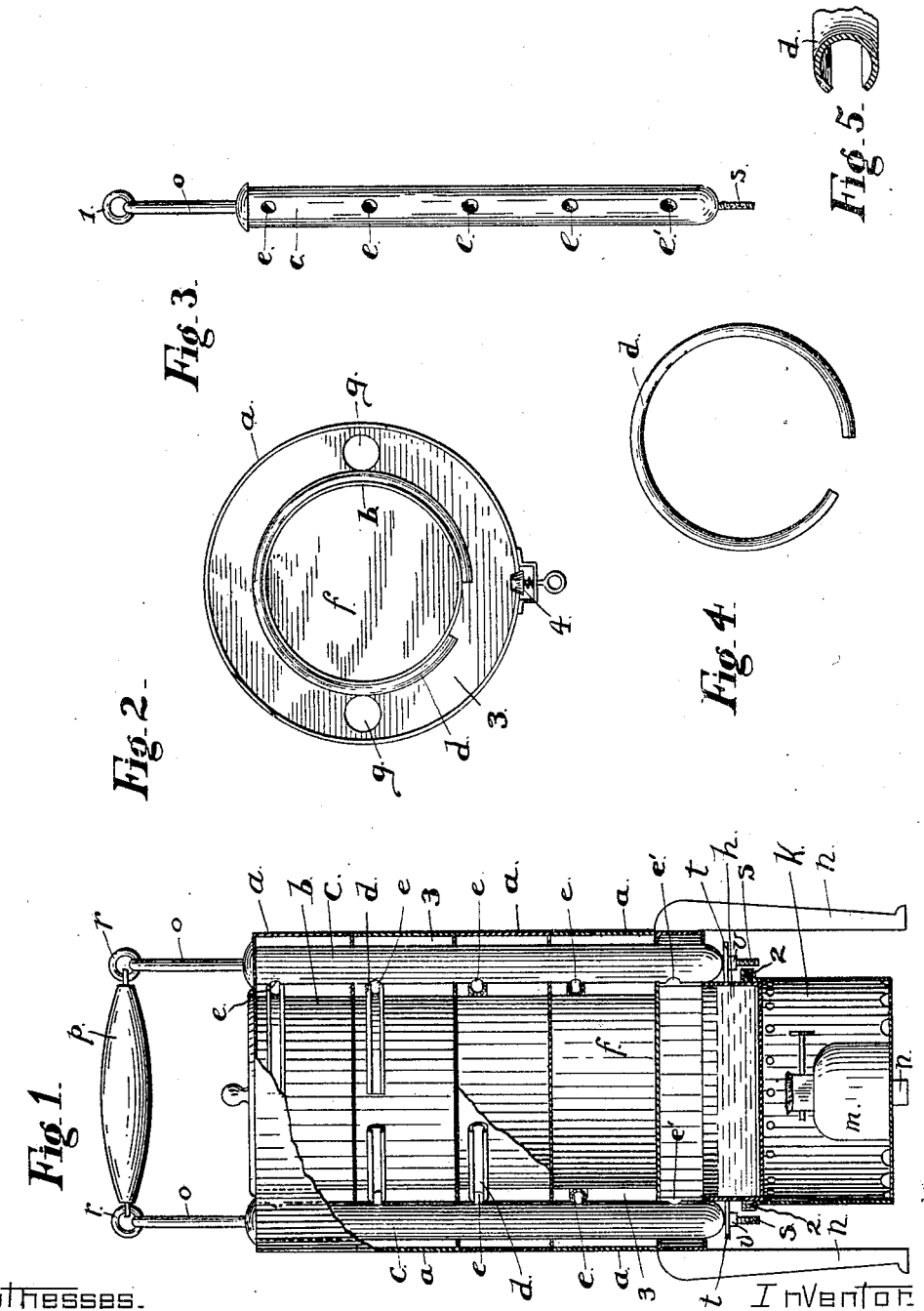

No. 773,654. Patented November 1, 1904.

UNITED STATES PATENT OFFICE.

JOSÉ T. LEMUS, OF DURANGO, MEXICO.

STEAM DINNER-PAIL.

SPECIFICATION forming part of Letters Patent No. 773,654, dated November 1, 1904.

Application filed February 16, 1904. Serial No. 193,925. (No model.)

*To all whom it may concern:*

Be it known that I, José TRINIDAD LEMUS, a citizen of the Republic of Mexico, residing at the city of Durango, Partido de Durango, State of Durango, Mexico, have invented certain new and useful Improvements in Steam Dinner-Pails, of which the following is a specification.

My invention relates to improvements in steam dinner-pails.

The objects of my invention are to provide a steam dinner-pail for holding a series of pans containing cooked food, one in which by means of the even distribution of steam each pan and its contents is kept at a like temperature.

In the use of pails for holding and heating a series of pans or plates of food as heretofore used a charcoal-brazier is placed under the pail, which heats too greatly the lowest pan and less and less each successive pan above, which obtains its heat from the one immediately below. This uneven distribution of heat results often in the burning of the contents of the lowest pan, while those of the upper pans are frequently cold. As for such pails the heat is obtained from the charcoal, the formation of carbonic gas is a resultant, which in a small compartment cannot be otherwise than harmful by the corruption of the atmosphere, as well as its deleterious effect upon the exposed contents of the pans, and, moreover, it often happens that a person cannot eat immediately upon the arrival of the pail and the charcoal is consumed and has to be replenished, which naturally increases the quantity of carbonic gas in the compartment, or the meal must be eaten cold, which is both antihygienic and disagreeable.

The foregoing inconveniences are overcome by the use of my dinner-pail, wherein the steam is evenly distributed to each pan by means of the circulating tubes and channels, which give a uniform heat to each receptacle in the desired degree and prevent cold or baked food being a consequence of the use of the device.

My invention consists in the construction and arrangement of parts, substantially as herein described and claimed.

In the drawings, Figure 1 is a longitudinal section through the pail. Fig. 2 is a plan view of one of the pans $a$, showing the rim $b$ and the inner victual-chamber $f$, the rubber washer $d$, the side-tube holes $g$, the safety-valve 4, and the steam-chamber 3. Fig. 3 is a detail view of one of the side tubes $c$, showing the ports $e$ $e'$, the same being hollow, but closed at both ends. Fig. 4 is a plan view of the rubber washer $d$. Fig. 5 is an enlarged section through the washer.

In Fig. 1 is shown the lamp $m$ in the chamber $k$, which is held to the water-boiler $h$ by means of the lugs 2. Such water-boiler, in connection with the legs $n$, forms a stand or support for the rest of pail, supporting the pans or receptacles $a$. The steam for heating is generated in the water-boiler $h$ by means of the spirit-lamp $m$ in the chamber $k$, which has suitable openings for draft, as shown in Fig. 1, and passes through the ports $e'$ into the side tubes $c$ and out through the ports $e$ into the chamber 3 by means of the rubber washer $d$, which has an outward-opening channel throughout its length and is open at its ends, as shown in Figs. 1 and 5. The washer is also used as a means for rigidly securing the pans $a$ in their proper position in relation to the tubes $c$.

The pail may be carried by the handle $p$, connecting with the side tubes $c$ by means of the eyes $r$ and the rods $o$. The bottom of the tubes is secured to the water-boiler by means of the threaded rods $s$ passing through the projections $t$ and held securely by the nuts $v$. The pail may have a suitable cover, as shown. The heat in the said pail should be obtained from either an alcohol or petroleum lamp, which by quick or direct heat—not by irradiation—heats the water in the steam-generator, which is provided with a bottom of copper, said metal being known as the best conductor of heat, and the existence of carbonic gas is much less, owing to the draft arrangement of the lamp, as well as to the combustion in such a flame being more hydrogenized than in the combustion of charcoal, while by the use of alcohol the volume of flame is rendered much less than otherwise.

If preferred, the safety-valve may be placed in a vertical position in the top pan instead of in a horizontal position, as shown, and omitted from the other pans, the placing of such valve in said position removing any tendency to the upsetting of the pail upon the escape of steam, the pressure being exerted from top to bottom.

Having thus described my invention, what I claim as new, and desire to secure by Letters Patent, is—

1. In a steam dinner-pail the combination of a boiler, side tubes leading from said boiler, said side tubes being provided with apertures opening inwardly into channeled partly-circular washers for the circulation of steam, an outer case and washers and pans therein contained, and means for heating said boiler, substantially as described.

2. In a steam dinner-pail the combination of an outer case, main supply-tubes leading from a boiler, partly-circular channels for conveying steam, and supports for pans therein contained substantially as described.

3. In a steam dinner-pail the combination of an outer coverable case, a boiler at its base, main supply-tubes leading from said case, channeled washers in contact with said tubes, pans securable to tubes and provided with steam-chambers and safety-valves substantially as described.

4. In a steam dinner-pail the combination of an outer case, side tubes for conveying steam, pans provided with chambers to rest in said case, channeled washers, in contact with said pans and tubes, a boiler under said pail and means for heating said boiler, substantially as described.

5. In a steam dinner-pail the combination of an outer coverable case, tubes and channels for conveying steam therein contained, pans to rest in said case and means for generating steam to fill said case, substantially as described.

6. In a steam dinner-pail the combination of the following instrumentalities: an outer case, pans resting in said case, tubes and channels to convey steam into said case, a boiler under said pail and means for heating the same, substantially as described.

7. In a steam dinner-pail the combination of the following instrumentalities: an outer coverable case, a boiler at the base of said pail, side tubes leading from said boiler and provided with apertures leading into partly-circular channels, pans to rest in said pail, substantially as described.

8. In a steam dinner-pail the combination of the following instrumentalities: an outer coverable case, tubes and channels for admitting steam into said case, a boiler securable to said case, pans for holding food provided with valves and steam-chambers and securable in said case and means for heating said boiler, substantially as described.

In testimony whereof I affix my signature in presence of two witnesses.

J. T. LEMUS.

Witnesses:
MABEL POUND LEROY,
LUIS MENA.